J. P. LEITZELL.
Adjustable Liquid-Measures.
No. 153,352.  Patented July 21, 1874.
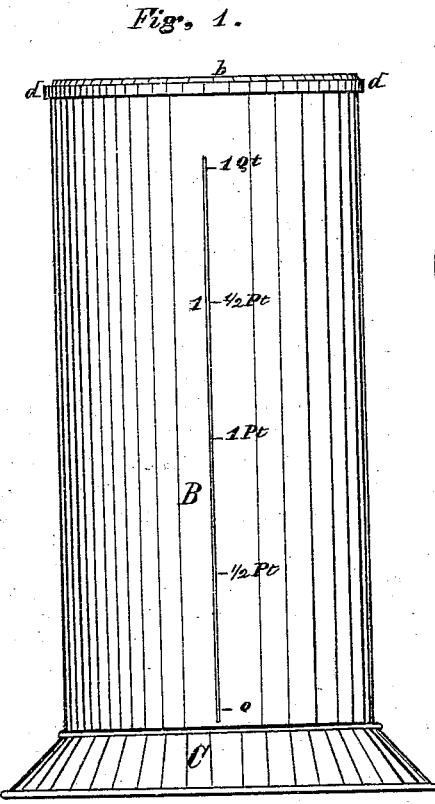
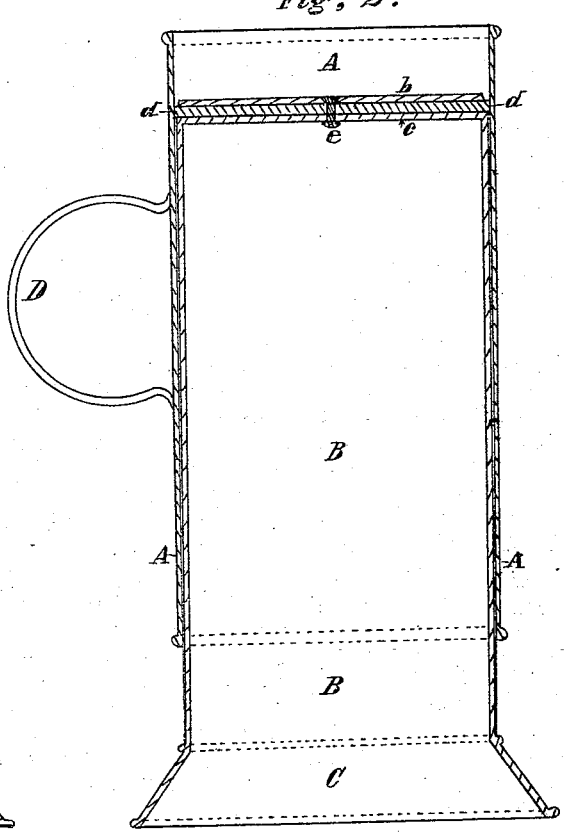
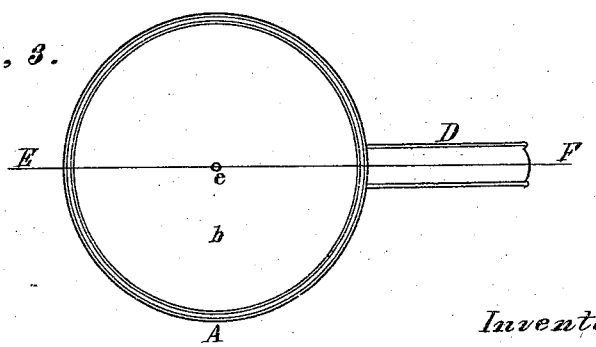
Witnesses.  Inventor.

UNITED STATES PATENT OFFICE.

JOHN P. LEITZELL, OF UNION DEPOSIT, PENNSYLVANIA.

IMPROVEMENT IN ADJUSTABLE LIQUID-MEASURES.

Specification forming part of Letters Patent No. 153,352, dated July 21, 1874; application filed April 6, 1874.

*To all whom it may concern:*

Be it known that I, JOHN P. LEITZELL, of the town of Union Deposit, Dauphin county, Pennsylvania, have invented a new and Improved Adjustable Measure, that can be used to measure liquids or solids; and I do hereby declare the following to be a full, clear, and exact description of the same, reference being had to the annexed drawings making a part of this specification, and to the letters of reference marked thereon.

The nature of my invention consists in the arrangement of the several parts so as to produce an adjustable graduated measure that is convenient and reliable in operation, substantially as is hereinafter set forth.

In the drawings, Figure 1 is a perspective view of the part of the device that acts as an adjustable bottom. Fig. 2 represents a vertical section of the measure, taken on the axial line E F, shown in Fig. 3. Fig. 3 is a top view of the device with the base removed.

Like letters and figures in the different views of the drawing represent like parts.

In the different figures in which it occurs, A represents the outer portion of the body of the measure. It is made cylindrical, of a proper size diametrically, and of suitable length for the purpose. It has no fixed bottom, but is made preferably of sheet-tin, and has its upper and lower ends wired to give it strength and a neat finish. A handle, D, also made of tin-plate, is securely attached to the outside, as is shown in Fig. 2. The portion B (see Figs. 1 and 2) is also made of tin-plate. It is given a cylindrical form, and in diameter is of a size that will permit it to be slid into the portion A. (See Fig. 2.)

The upper end of the portion B is closed with a piece of the same material of which the body is composed. Upon it is mounted a washer or disk of thin vulcanized gum. Said gum disk is made slightly larger in diameter than the inside diameter of the outer piece A of the measure. A cap-plate, *b*, also circular in form, and of suitable thickness, is provided. It is made of the same diameter as the body of the part B, and is secured to it by a rivet that is inserted in a proper-sized hole in the center of the cap-plate *b*, gum disk *d*, and top of portion B, so that the gum disk *d* is thus held in tight connection with the cylindrical part B. The cap *b* should be slightly concave on the under side, so that the edge is caused to bear tightly upon the washer *d*.

Upon the lower end of the cylindrical part B a flaring or conical-shaped foot, C, is attached. (See Figs. 1 and 2.) Said foot C answers the double purpose of a handle to operate the device when it is necessary to change the dimensions of the measure, and also as a base, upon which the whole rests securely.

The different sizes of the measure can be graduated in a scale upon the side of the cylindrical part B. (See Fig. 1.)

In operation the measure is adjusted to the desired size by sliding the part A upon the part B until the lower edge of the portion A is in a line with the graduated mark that indicates the correct measure. The measure can now be filled, and if molasses or apple-butter is the article to be measured, it can be readily removed by pushing upon the lower portion B, having first inverted the measure over the receptacle. As the bottom B can be brought to the upper edge of the outer portion A, the entire contents of the measure are removed by simply scraping the portion off of the bottom *b* that may remain attached thereto. The gum disk *d* renders the measure tight, and as the contents rest upon the bottom *b*, it is only necessary to have the disk *d* of sufficient size to make a joint that will hold the contents, as it is evident that their weight will not cause the outside portion A to change its position. The interior of the lower portion B also serves as a fixed measure, and as it is required to be somewhat longer than the portion A, it can be made to answer for a dry measure, corresponding to the largest liquid-measure indicated on the scale of the other or adjustable measure.

Having given a full, clear, and accurate description of my invention, and its manner of operation, and set forth its advantages, what I claim as new of my invention, and desire to secure by Letters Patent, is—

The adjustable measure composed of the outer and inner cylinders A B, gum disk *d*, and washer or cap-plate *b*, arranged and operating substantially as set forth.

J. P. LEITZELL. [L. S.]

Witnesses:
 R. J. FLEMING,
 WM. P. PATTON.